United States Patent [19]

Allen et al.

[11] Patent Number: 5,799,950
[45] Date of Patent: Sep. 1, 1998

[54] LUBRICATED JOINT WITH EQUALIZING PRESSURE ZONE

[75] Inventors: Joseph E. Allen, Brimfield; Robert A. Lapke, Peoria; Dean M. Peterson, Roanoke, all of Ill.

[73] Assignee: Caterpillar Inc., Peoria, Ill.

[21] Appl. No.: 721,647

[22] Filed: Sep. 26, 1996

[51] Int. Cl.$^6$ .................................................. F16J 15/16
[52] U.S. Cl. ........................ 277/3; 277/63; 277/72 R; 384/213
[58] Field of Search ............................ 277/3, 59, 63, 277/29, 72 R, 72 FM; 384/377, 398, 399, 213

[56] References Cited

U.S. PATENT DOCUMENTS

| | | | |
|---|---|---|---|
| 2,510,414 | 6/1950 | Philbrick | 277/63 |
| 2,681,259 | 6/1954 | White | 384/213 |
| 2,720,283 | 10/1955 | Lares . | |
| 3,044,838 | 7/1962 | Winer et al. | 384/213 |
| 3,045,650 | 7/1962 | Ambrosini | 277/72 |
| 3,923,313 | 12/1975 | Bailey | 277/63 |
| 3,947,077 | 3/1976 | Berg et al. . | |
| 4,765,757 | 8/1988 | Hartl . | |
| 4,781,257 | 11/1988 | Gee et al. . | |

FOREIGN PATENT DOCUMENTS

| | | | |
|---|---|---|---|
| 006095 | 1/1980 | European Pat. Off. | 384/398 |
| 1346647 | 11/1963 | France | 384/398 |
| 2242229 | 3/1974 | Germany | 384/398 |
| 779419 | 7/1957 | United Kingdom | 384/213 |

Primary Examiner—Scott Cummings
Attorney, Agent, or Firm—Diana L. Charlton

[57] ABSTRACT

The present invention includes a means of equalizing pressure within a sealed pin joint assembly. The pin joint assembly includes slidably connecting a pin through a bearing assembly fitted within a bore in an equalizer bar. The pin is circumferentially surrounded by a pair of seals disposed on either side of the bearing assembly for sealing within the equalizer bar. The seals are positioned adjacent the bearing assembly to define a pair of cavities therebetween. A receiving passage extends from a counterbore at an outer surface of the equalizer bar and terminates at the bearing assembly and is fluidly connected with the pin joint assembly. A grease zerk is disclosed within the receiving passage as a means to direct fluid into the joint wherein accumulation within the cavities is expected. As the pressure fluctuates within the cavities during operation, the lubricating fluid is free to travel through a pair of discharge passages and an interconnected cross passage therebetween.

8 Claims, 2 Drawing Sheets

U.S. Patent    Sep. 1, 1998    Sheet 1 of 2    5,799,950
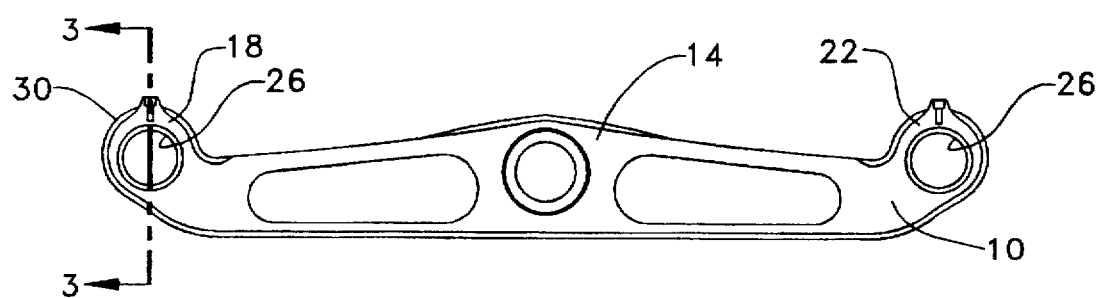
Fig_1_
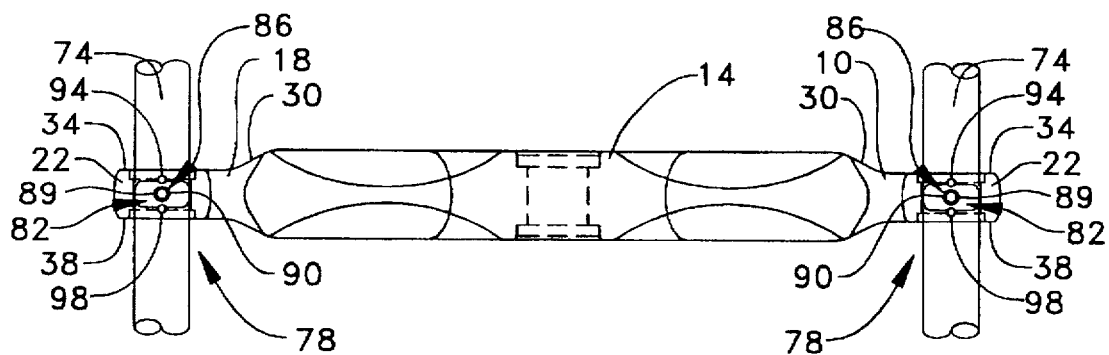
Fig_2_

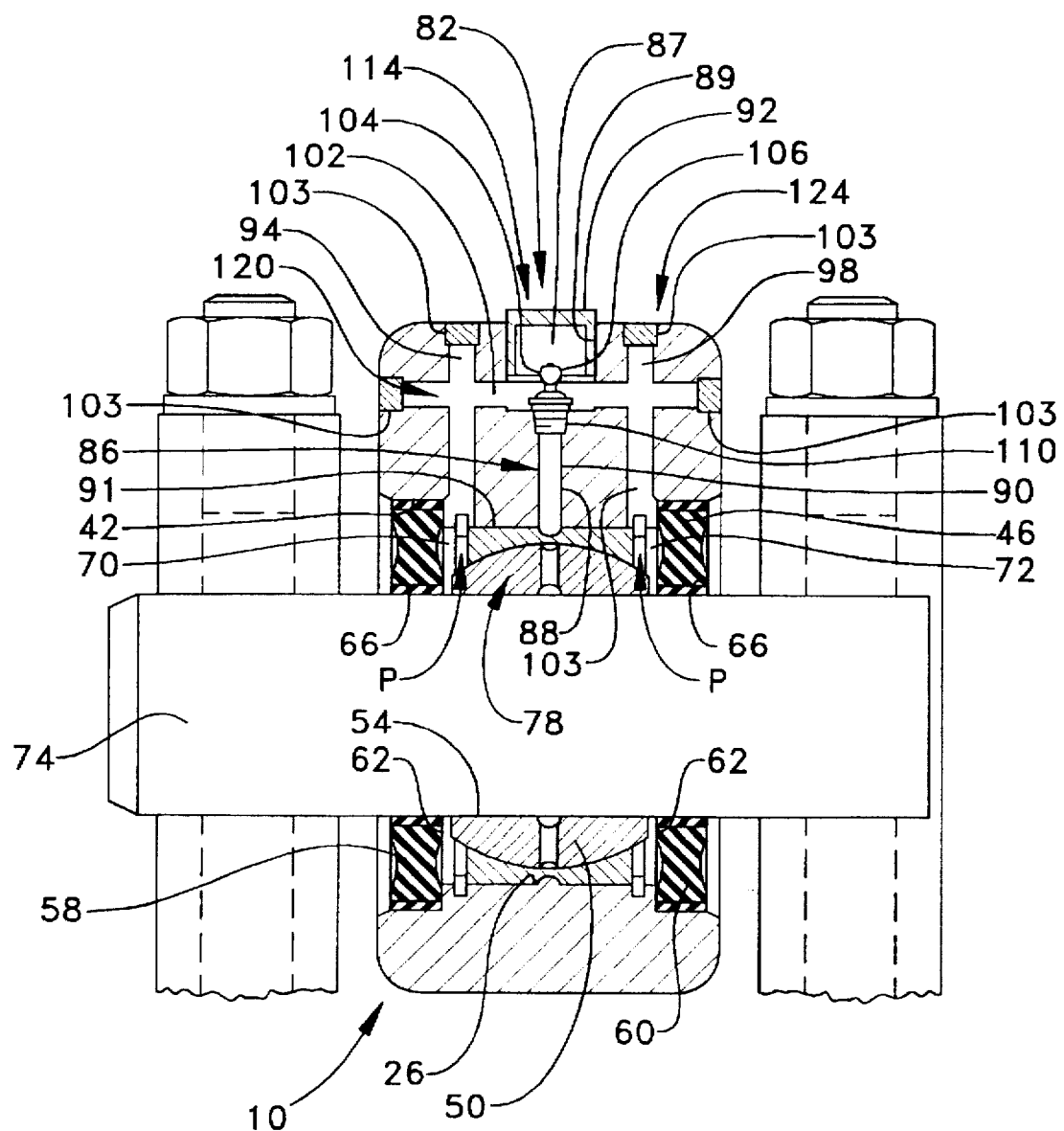

LUBRICATED JOINT WITH EQUALIZING PRESSURE ZONE

TECHNICAL FIELD

This invention relates generally to lubricated joints and more particularly to the ability to equalize the pressure within the joint to avoid excessive pressure build-up.

BACKGROUND ART

Lubricated joints generally include the use of a sealing means between first and second members. The addition of lubricant to the joint to reduce wear between the first and second members generally increases the pressure around the sealing means. The increase in pressure around the sealing means may cause damage to the sealing means or total destruction of its sealing ability. It is well known to allow the excessive pressure around the sealing means to leak around the sealing means so as to avoid these problems. Unfortunately, the use of the sealing means as a method of relieving pressure within the joint allows for a breakdown of the effectiveness of the sealing means.

The present invention is directed to overcoming the problems as set forth above.

DISCLOSURE OF THE INVENTION

In one aspect of the present invention, a sealed joint assembly comprises a first member that has an end portion with a central bore defined therethrough and an inner fluid communication means which extends from an outer surface a predetermined distance and terminates within the bore. The fluid communication means includes a receiving passage and first and second discharging passages disposed on opposite sides of the receiving passage and fluidly connected therewith. A second member is movably connected to the first member and is slidably disposed within the bore. The second member is fitted against the first member to define a joint. A pair of spaced sealing means are each disposed within an annulus in the bore and circumferentially surround the second member. The pair of sealing means each has an inner surface and an outer surface. A cavity is defined within the bore adjacent each of the pair of sealing means and is fluidly connected to the fluid communication means. Means is included for directing a fluid within the receiving passage and into the joint for substantial accumulation within the pair of cavities. The accumulation of fluid within the pair of cavities establishes a variable pressure therein. Means is disposed within the end portion which fluidly communicates with the first and second discharging passages for equalizing the pressure of the fluid within the pair of cavities so that the fluid pressure is prevented from building around the pair of sealing means.

In another aspect of the present invention, a sealed pin joint assembly for use on an equalizer bar of a construction machine comprises the equalizer bar having an end portion with a bore defined therethrough. An inner fluid communication means extends from an outer surface a predetermined distance and terminates within the bore. The fluid communication means includes a receiving passage and pair of discharging passages fluidly connected to the receiving passage. A pin is movably connected to the equalizer bar and is slidably disposed within the bore to define a pin joint. A pair of sealing means are each disposed within an annulus in the bore and circumferentially surround the pin. Each of the pair of sealing means has an inner surface and an outer surface. A bearing assembly is disposed in the bore between the pair of sealing means and circumferentially surrounds the pin. The bearing assembly is located adjacent the inner surfaces of the sealing means at its ends to define a pair of cavities therebetween which are fluidly connected to the fluid communication means. One of the pair of cavities is operatively associated with one of the pair of discharge passages and the other of the pair of cavities is operatively associated with the other of the pair of discharge passages. Means is included for directing a fluid within the receiving passage and into the pin joint for substantial accumulation within the pair of cavities. The accumulation within the pair of cavities establishes a variable pressure therein. Means is disposed within the end portion which fluidly communicates with the first and second discharging passages for equalizing the pressure of the fluid within the pair of cavities so that the fluid pressure is prevented from building around the pair of sealing means.

The present invention includes a means to equalize the pressure within a sealed joint so that the sealing means therein are not damaged by excessive pressure build-up therearound during operation.

BRIEF DESCRIPTION OF THE DRAWINGS

FIG. 1 is a diagrammatic front view of a equalizer bar showing a view of the present invention;

FIG. 2 is a diagrammatic top view of the equalizer bar in FIG. 1; and

FIG. 3 is an enlarged detail view taken along line 3—3 in FIG. 1.

BEST MODE FOR CARRYING OUT THE INVENTION

An equalizer bar 10 for a construction machine (not shown) is shown in FIGS. 1–3. The equalizer bar 10 has a center portion 14 and a pair of end portions 18,22. For purposes of clarity, only one end portion 18 will be described in detail. It should be understood, however, that the other end portion 22 has similar features which function in a similar manner as that disclosed on end portion 18. End portion 18 has a bore 26 which extends therethrough and an outer surface 30 therearound and a pair of spaced side walls 34,38 opposite one another. The bore 26 has a pair of annuli 42,46, which can be seen more clearly in FIG. 3. The annuli 42,46 are located within the bore 26 in close proximity to the side walls 34,38, respectively. A spherical bearing assembly 50 is press fitted within the bore 26 to substantially cover the surface of the bore 26. The bearing assembly 50 has a bore 54 therethrough. A pair of seals 58,60 of any suitable type, such as a radial lip seal, are positioned within the bore 26. One of the pair of seals 58 is disposed in the annulus 42 and the other of the pair of seals is disposed in the annulus 46. The seals 58,60 are located on opposite sides of the bearing assembly 50 and each seal 58,60 has an inner surface 62 facing the bearing assembly 50 and an outer surface 66 facing away from the bearing assembly 50. The inner surface 62 of the seals 58 lie adjacent the opposite ends of the bearing assembly 50 to define a pair of cavities 70,72 therebetween.

A pin 74 is slidably disposed within the bore 54 of the bearing assembly 50 for movable connection to the equalizer bar 10 to define a pin joint assembly 78. The seals 58,60 circumferentially surround the pin 74 for sealing within the bore 26. It should be recognized that the pin 38 might be slidably disposed in the bore 26 of the equalizer bar 10 in a manner which provides a suitable fit without the use of a bearing assembly 50.

An inner fluid communication means 82, which can be seen more clearly in FIG. 3, is located within the end portion 18 and extends from the outer surface 30 and terminates within the bore 26 at the bearing assembly 50. The inner fluid communication means 82 includes a receiving passage 86 having a first and a second end portion 87,88. The first end portion 87 of the receiving passage 86 is a counterbore 89 extending inwardly from the outer surface 30 and terminating a predetermined distance within the end portion 18. The second end portion 88 is a grease passage 90 extending from the counterbore 89 and terminating in close proximity to a central portion 91 of the bearing assembly 50 for fluid communication therewith. The counterbore 89 has a larger diameter than the grease passage 86. A plug 92 is threadably disposed partially within the counterbore 89 to seal the counterbore 89 from the atmosphere. The inner fluid communication means 82 also includes a pair of discharge passages 94,98 positioned on opposite sides of the receiving passage 86 between the respective seals 42,46. The discharge passages 94,98 extend from the outer surface 30 and terminate at the opposite ends of the bearing assembly 50 for fluid communication with the counterbore 89 and respective cavities 70,72. The discharge passages 94,98 are substantially positioned adjacent the respective seals 42,46 and are preferably at a close distance to the seals 42,46. A cross passage 102 extends through the end portion 18 from the outer surface 30 and is substantially parallel to the bore 26. The cross passage 102 extends through discharge passage 94, counterbore 89 and discharge passage 98 to fluidly connect these passages. A plurality of plugs 103 are threadably disposed within the discharge passages 94,98 and the cross passage 102 at the intersection between the respective passages and the atmosphere to substantially seal the pin joint assembly 78.

A grease zerk 104 with a head 106 and a tapered threaded body 110 is partially disposed within the receiving passage 86. The body 110 is threadably received within the grease passage 90 a predetermined distance with the head 106 partially extending into the counterbore 89. The grease zerk 104 provides a means 114 for allowing a lubricating fluid of any suitable type, such as lubricating grease or oil, to be directed into the pin joint assembly 78 through the receiving passage 86 and grease passage 90 in a well-known manner, such as by a grease pump. It should be understood, however, that any suitable method for allowing lubricating fluid into the receiving passage 86 could be used. During lubrication of the pin joint assembly 78, the addition of the lubricating fluid causes a significant pressure change within the pin joint assembly 78 and the lubricating fluid is thereafter substantially accumulated in the cavities 70,72 establishing a variable pressure P therein.

A means 120 for equalizing the pressure P within the cavities 70,72 is achieved through the position of the discharge passages 94,98 and the cross passage 102.

INDUSTRIAL APPLICABILITY

In order to reduce wear in the pin joint assembly 78, lubricating fluid is forced into the grease passage 90 through the grease zerk 104 by removal of the plug 92. The lubricating fluid passes through the bearing assembly 50 and substantially accumulates in the cavities 70,72 between the bearing assembly 50 and the seals 58,60. During the addition of the lubricating fluid, air pockets may form within the lubricating fluid. In order to fully fill the pin joint assembly 78 with lubricating fluid, air therein is pushed through the discharge passages 94,98 into the cross passage 102 and out to the atmosphere through the open counterbore 89.

Simultaneously, any excess lubricating fluid is pushed out to the atmosphere in a similar manner to prevent overfilling and overpressurization. The plug 92 is inserted in the counterbore 89 after filling the pin joint assembly 78 with lubricating fluid. Lubricating fluid, substantially accumulated in the cavities 70,72, has an internal pressure P which fluctuates due to operational movements within the pin joint assembly 78 and varies according to the amount of lubricating fluid within the system.

To prevent any build up of pressure around the seals 58,60 during the operational movements, the pressure P within the cavities 70,72 is equalized as the lubricating fluid passes through the discharge passages 94,98 and across the cross passage 102. Equalization occurs within the sealed pin joint assembly 78 so that no lubricating fluid is leaked to the atmosphere. The ability to equalize the pressure P within the pin joint assembly 78 protects the seals 58,60 from bulging and subsequent damage. The relative position of the discharge passages 94,98, in close proximity to the seals 58,60, and the cross passage 102 provides an effective means to protect the seals 58,60 from excessive pressure.

In view of the above, the predetermined positioning of passages in a sealed joint assembly which is lubricated provides a low cost means to protect the seals from excessive pressure within the assembly.

We claim:

1. A sealed joint assembly, comprising:

a first member having an end portion with a central bore defined therethrough and an inner fluid communication means extending from an outer surface a predetermined distance and terminating within the bore, the fluid communication means including a receiving passage, first and second discharging passages disposed on opposite sides of the receiving passage and a cross passage extending through the end portion and crossing the first discharge passage, the receiving passage and the second discharge passage to fluidly connect them;

a second member movably connected to the first member and slidably disposed within the bore, the second member fitted against the first member to define a joint;

a pair of spaced sealing means each disposed within an annulus in the bore and circumferentially surrounding the second member, the pair of sealing means each having an inner surface and an outer surface;

a cavity defined within the bore adjacent each of the pair of sealing means which is fluidly connected to the fluid communication means;

means for directing a fluid within the receiving passage and into the joint for substantial accumulation within the pair of cavities, the accumulation within the pair of cavities establishing a variable pressure therein; and plugging means disposed within the receiving passage, first and second discharge passages and cross passage for retaining the fluid within the point assembly and preventing the communication of fluid outside thereof.

2. The joint assembly of claim 1, wherein the pair of cavities is located adjacent the discharge passages and the receiving passage and the discharging passage are disposed a predetermined distance from the sealing means.

3. The joint assembly of claim 1, wherein the discharge passage is located between the sealing means and the receiving passage.

4. The joint assembly of claim 2, wherein the discharge passage is substantially adjacent the sealing means.

5. A sealed pin joint assembly for use on an equalizer bar of a construction machine, comprising:

the equalizer bar having an end portion with a bore defined therethrough and an inner fluid communication means extending from an outer surface a predetermined distance and terminating within the bore, the fluid communication means including a receiving passage, a pair of discharging passages fluidly and a cross passage extending through the end portion and crossing the receiving passage and the pair of discharge passages to fluidly connect them;

a pin movably connected to the equalizer bar and slidably disposed within the bore to define a pin joint;

a pair of sealing means each disposed within an annulus in the bore and circumferentially surrounding the pin, each of the pair of sealing means having an inner surface and an outer surface;

a bearing assembly disposed in the bore between the pair of sealing means and circumferentially surrounding the pin, the bearing assembly located adjacent the inner surfaces of the sealing means at its ends to define a pair of cavities therebetween which are fluidly connected to the fluid communication means, one of the pair of cavities being operatively associated with one of the pair of discharge passages and the other of the pair of cavities being operatively associated with the other of the pair of discharge passages;

means for directing a fluid within the receiving passage and into the pin joint for substantial accumulation within the pair of cavities, the accumulation within the pair of cavities establishing a variable pressure therein; and plugging means disposed within the receiving passage, the pair of discharge passages and cross passage for retaining the fluid within the joint assembly and preventing the communication of fluid outside thereof.

6. The pin joint assembly of claim 5, wherein the pair of cavities are located adjacent to the respective pair of discharge passages and the receiving passage and the discharging passages are disposed a predetermined distance from the sealing means.

7. The pin joint assembly of claim 5, wherein one of the pair of discharge passages is located between the one of the pair of sealing means and the receiving passage and the other of the pair of discharge passages is located between the other of the pair of sealing means and the receiving passage.

8. The pin joint assembly of claim 6, wherein the discharge passages are substantially adjacent the respective sealing means.

\* \* \* \* \*